United States Patent [19]
Gutrdige

[11] 3,837,919
[45] Sept. 24, 1974

[54] PREPARATION OF CADMIUM ELECTRODES

[75] Inventor: Ian Paul Gutrdige, Kingswinford, England

[73] Assignee: The International Nickel Company, Inc., New York, N.Y.

[22] Filed: Oct. 20, 1972

[21] Appl. No.: 299,355

[30] Foreign Application Priority Data
Oct. 26, 1971  Great Britain.................... 49669/71

[52] U.S. Cl..................................... 136/24, 136/76
[51] Int. Cl. .......................................... H01m 35/30
[58] Field of Search........................ 136/24, 75–76, 136/67–68, 20, 34, 28–31; 204/35, 56, 50

[56] References Cited
UNITED STATES PATENTS

| | | | |
|---|---|---|---|
| 2,832,813 | 4/1958 | Peters................................... | 136/24 |
| 2,934,581 | 4/1960 | Dassler............................ | 136/24 X |
| 3,066,178 | 11/1962 | Winkler................................ | 136/24 |
| 3,214,355 | 10/1965 | Kandler............................ | 204/56 R |
| 3,320,139 | 5/1967 | Golben et al. ........................ | 204/35 |
| 3,326,721 | 6/1967 | Henderson et al.................... | 136/24 |
| 3,400,056 | 9/1968 | Hills.................................. | 136/75 X |
| 3,483,259 | 12/1969 | Seiger et al. .......................... | 136/241 |
| 3,573,101 | 3/1971 | Beuchamp............................ | 136/76 |
| 3,653,967 | 4/1972 | Beuchamp............................ | 136/75 |

*Primary Examiner*—Anthony Skapars

[57]  ABSTRACT

A process for producing negative active mass suitable for use in nickel-cadmium cells or similar cells or batteries which comprises electrically depositing cadmium hydroxide from an electrolyte containing cadmium cations and reducible anions such as nitrate anions and a small proporation of nickel cations. The negative active mass thus produced contains about 1 percent to about 10 percent of nickel, has excellent initial capacity and exhibits excellent retention of capacity after electrochemical cycling.

5 Claims, 1 Drawing Figure

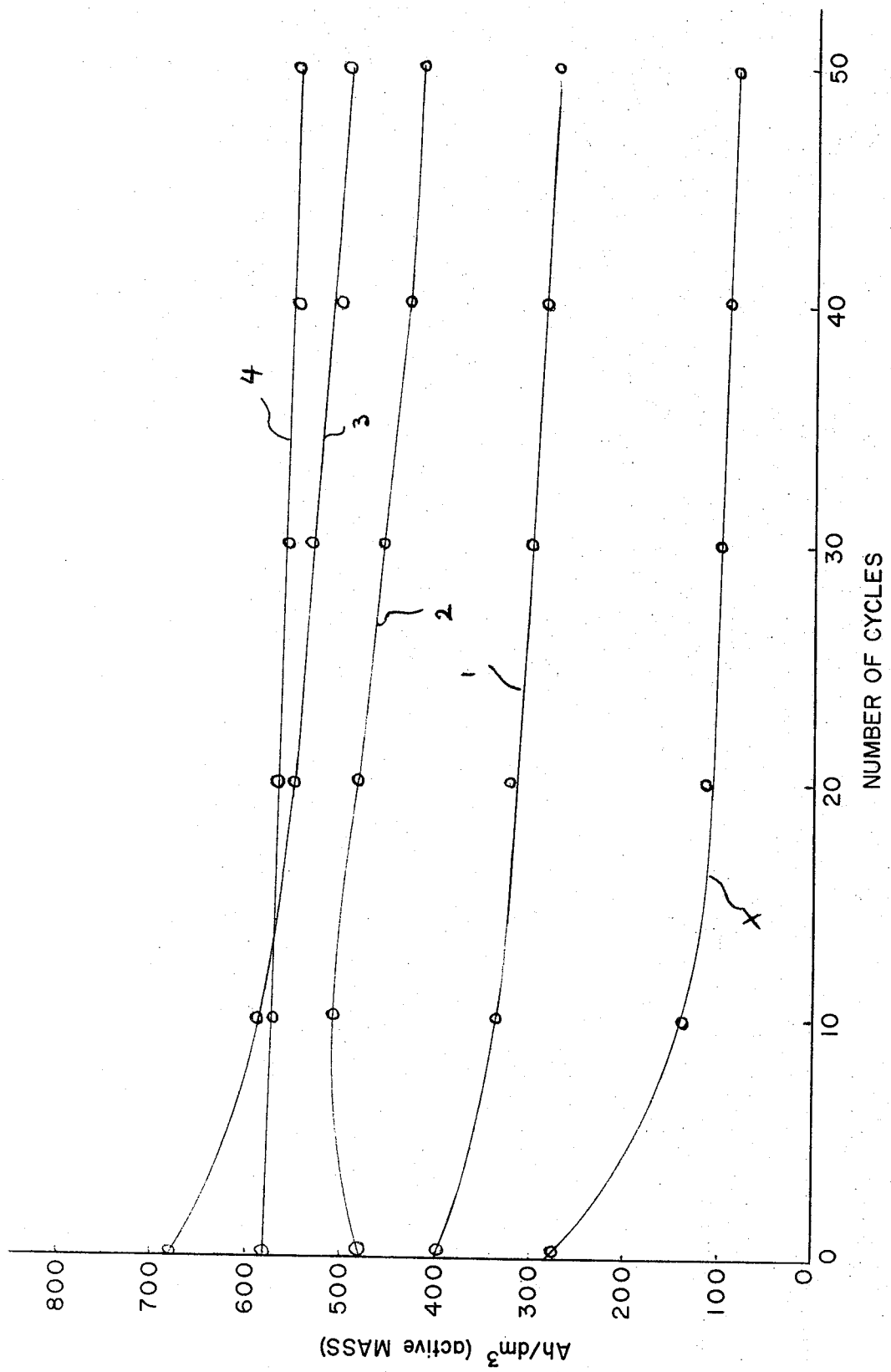

PREPARATION OF CADMIUM ELECTRODES

This invention relates to the production of negative active mass for use in nickel-cadmium cells and, more particularly, to the production of negative active mass containing both cadmium and nickel.

In the production of cadmium electrodes for use in cells (or batteries), it is well known to deposit cadmium hydroxide electrolytically on a conducting support. If, as is most usual, the electrode is to be used as a negative electrode in a nickel-cadmium or similar cell, e.g., a silver-cadmium cell, the hydroxide is first reduced to an active mass to metallic cadmium.

Two important requirements in cells are high energy per unit volume and the maintenance of capacity on repeated cycles of charge and discharge. Our object in this invention is both to render the energy per unit volume of the active mass high and to reduce or even to eliminate the loss of capacity on repeated cycles of charge and discharge. Our object in this invention is to provide a process for electrolytically depositing cadmium active mass of high initial capacity which retains its high value after repeated cycling.

A satisfactory method of depositing cadmium hydroxide is described by Kandler in the British Pat. Specification No. 917,291. In this method, the conducting support is porous and is made the cathode in an aqueous electrolyte containing cadmium ions and reducible ions the redox potential of which is more positive than the discharge potential of the cadmium ions; typically the electrolyte is a solution of cadmium nitrate in nitric acid. Another process for depositing cadmium hydroxide is disclosed in U.S. Pat. No. 3,320,139 to Golben et al. The product of the Golben et al. process suffers from lack of retention of the initial capacity.

An object of the present invention is to provide a novel process for producing negative active mass for nickel-cadmium storage cells.

Another object of the present invention is to provide a novel product as made by the process of the present invention.

Other objects and advantages will become apparent from the following description taken in conjunction with the drawing in which the FIGURE is a graph interrelating capacity, the cycles of charge-discharge for various active mass compositions.

Generally speaking, in the present invention the Kandler process is modified so that the electrolyte contains a small proportion of a nickel salt in addition to the cadmium salt so that nickel amount to from about 1 percent to about 10 percent by weight of the deposit is co-deposited with the cadmium hydroxide as nickel hydroxide. Although the nickel hydroxide remains inert and does not contribute to the capacity of the electrode its presence renders the deposit denser so that the loss of energy per unit volume resulting from the presence of the nickel hydroxide is offset, though it is necessary to strike a balance between the improvement given by the increased density and the reduction given in the actual amount of cadmium deposited per unit volume that results from the simultaneous deposition of nickel. Preferably the weight of the nickel is from 4 to 6 percent of the weight of the deposit. It appears probable that the deposition of cadmium hydroxide occurs by a process of nucleation and growth of crystals and that the presence of the nickel hydroxide alters the nucleation steps to as to produce a denser deposit.

The usual explanation offered for the tendency for cadmium electrodes to lose capacity during successive cycles of charge and discharge is that the cadmium is not converted directly to cadmium hydroxide, but rather a complex cadmium hydroxide is formed and is soluble in the electrolyte, and cadmium is redeposited from the electrolyte as larger crystals so that in the course of time the surface area is reduced. It seems likely that the nickel hydroxide by assisting nucleation and growth in the course of this redeposition reduces or eliminates the loss of surface area.

In the Kandler process as described and carried on hitherto, the conducting supports are porous, usually sintered nickel plaques, and serve only as carriers of the active mass and electrical conductors, and they make the cells much bulkier and heavier than is desirable. Under the conditions normally prevailing in the operation of the Kandler process, the cadmium hydroxide will not adhere to a smooth surface, and indeed the reason why the supports must be porous in the Kandler process is that there must be pores to hold the deposited hydroxide.

According to a further and important feature of the present invention the support on which the deposit is formed presents a smooth impermeable surface, and the electrolysis is so controlled that the deposited mass adheres to the support. It is thus possible to use metal foil as the support, with considerable decrease in both the volume and weight of the cell. When the deposit is formed on the smooth impermeable surface in the present invention, the current density is at least about 25 amperes per square meter ($A/m^2$), normally not less than about 50 $A/m^2$, and advantageously at least about 400 $A/m^2$. There is no theoretical upper limit, but in practice 1,000 $A/m^2$ is about the maximum, having regard to the practical difficulty of passing a large current through thin metal foil. The pH of the electrolyte is another variable which affects the deposit, and in general the lower the pH the higher the current density should be to produce a deposit of desired density. Of course, high current density involves the consumption of more energy, but it reduces the time required for the deposition of a deposit of given weight and it improves the adhesion of the deposit. It is, of course, necessary to avoid precipitation of cadmium hydroxide in the electrolyte, and for this purpose, the pH of the electrolyte should not exceed 6. With such a high pH value, a nickel-containing deposit can be produced with a current density as low as 50 $A/m^2$, but taking all factors into account, it is preferred to make the current density at least 400 $A/m^2$.

The nickel content of the deposit is found to vary somewhat with the pH, the current density and time, but the most important factor in determining it is the nickel content of the electrolyte.

In forming an adherent deposit on metal foil, the process should be carried on for so long that the weight of the deposit is at least equal to the weight of the foil.

The foil is preferably nickel, but may be of any other suitable metal such as copper. In order to save weight, it should be as thin as is feasible, foil 0.007 millimeter (mm) thick being very suitable.

The reducible ions in the electrolyte may be any of those capable of use in the Kandler process, e.g., chromate, though nitrate ions are preferred. It is desirable, but not essential, that the anions of the cadmium and nickel salts should be the same. The pH of the electrolyte can be controlled as in the Kandler process, because of the high rate of deposition with the high current density, there is no need to heat the electrolyte as in the process of U.S. Pat. No. 3,573,101.

The invention is not limited to the production of adherent deposits on foil. A nickel-containing deposit can be formed on a porous support under the ordinary conditions of operation of the Kandler process. Again, a deposit may be formed on an impermeable support under similar conditions and be continuously removed from the support for use in pocket cells. In this case, the support may be a cylinder partly immersed and rotating slowly in the electrolyte, and the deposit may be removed by a scraper.

Some examples will now be given, in each of which the aqueous electrolyte contained one molar (1M) cadmium nitrate and was maintained at room temperature. In each also, the support was nickel foil, and the deposit was reduced before its initial capacity was determined.

EXAMPLE 1

0.1M nickel nitrate was added to the electrolyte, and the electrolysis was carried on for 3.5 minutes at a cathode current density of 400 A/m$^2$, the pH being 6.0. The deposit contained 1.85 percent nickel and had an apparent density of 1.44 grams per cubic centimeter (g/cc). The initial capacity of the electrodes comprising foil and deposit was 360 ampere hours per decimeter cubed (Ah/dm$^3$) (0.29 ampere hour per gram (Ah/g)) and after 50 cycles had fallen 224 Ah/dm$^3$ (0.18 Ah/g).

EXAMPLE 2

The conditions were the same as in Example 1 but the nickel nitrate content of the electrolyte was increased to 0.2M. The deposit contained 3.22 percent nickel and had an apparent density of 2.20g/cc. The initial capacity of the electrode was 440 Ah/dm$^3$ (0.23 Ah/g) and after 50 cycles this had fallen to 337 Ah/dm$^3$ (0.20 Ah/g).

EXAMPLE 3

The nickel nitrate content of the electrolyte was increased to 0.25M, the pH was maintained at 3.0, and the electrolysis was carried on for 4 minutes at a cathode current density of 400 A/m$^2$. The deposit contained 4.19 percent nickel with an apparent density of 2.56 g/cc. The initial capacity of the deposit was 610 Ah/dm$^3$ (0.25 Ah/g) and after 50 cycles the capacity was 440 Ah/dm$^3$ (0.20 Ah/g).

EXAMPLE 4

Under the same conditions as Example 3, the deposition time was increased to 8 minutes. The deposit contained 5.65 percent nickel and had an apparent density of 2.85 g/cc. The initial capacity was 580 Ah/dm$^3$ (0.25 Ah/g) and after 50 cycles it was still 580 Ah/dm$^3$ (0.25 Ah/g).

EXAMPLE 5

The nickel nitrate content of the electrolyte was increased to 0.4M, the pH was maintained at 3.0 and electrolysis was carried out at 400 A/m$^2$ for 4 minutes. The deposit contained 9.3 percent nickel and had an apparent density of 2.80 g/cc. The initial capacity was 480 Ah/dm$^3$ (0.20 Ah/g) and after 50 cycles was still 480 Ah/dm$^3$ (0.20 Ah/g).

Example 5 shows that because of the increased nickel content and consequent reduced cadmium content of the deposit, the initial capacity fell below that of Example 4, although the advantageous feature of maintenance of the capacity for 50 cycles was obtained.

By way of comparison, and to show the importance of the presence of a nickel salt in the electrolyte, cadmium hydroxide was deposited on the nickel foil at a current density of 800 A/m$^2$ for 1.5 minutes from an electrolyte containing 1M cadmium nitrate adjusted to pH 6.0 with ammonium hydroxide. The deposit had an apparent density of 1.15 g/cc and gave an initial capacity of 248 Ah/dm$^3$ (0.24 Ah/g), but after 50 cycles the capacity had fallen to 83 Ah/dm$^3$ (0.08 Ah/g).

The manner in which the capacity fell throughout 50 cycles of charge and discharge in the products described in Examples 1 to 4 and in the comparative test is shown in the accompanying drawing in which the capacity in ampere hours per cubic decimeter is plotted as ordinates against the number of cycles as absciessae. Referring now thereto, curves marked 1, 2, 3 and 4 refer to the products of Examples 1, 2, 3 and 4, respectively, whereas the curve marked X refers to the product of the comparative test, which product contained no nickel. From the drawing, it is clear that negative active cadmium masses containing about 4 percent to about 6 percent by weight of nickel are highly advantageous with respect to initial and retained energy storage capacity per unit volume.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. In a process for electrolytically depositing cadmium hydroxide on an electrically conducting support made cathodic in an electrolyte containing cadmium ions and reducible anions, the redox potential of which is more positive than the discharge potential of the cadmium ions, the improvements comprising employing as the electrically conductive support an impermeable foil, employing an electrolyte which contains not only cadmium ions, but also a small but effective proportion of nickel ions sufficient to provide about 1 percent to about 10 percent by weight of nickel as nickel hydroxide in the deposit and electrolytically depositing at a cathodic current density of at least about 25 amperes per square meter so as to ensure adherence of the nickel-containing cadmium hydroxide deposit on the surface of the impermeable foil.

2. A process as in claim 1 in which the support is nickel foil and the cathode current density is at least about 50 A/m$^2$.

3. A process as in claim 2 in which the cathode current density is at least about 400 A/m$^2$.

4. A process as in claim 1 in which the nickel deposited comprises about 4 percent to about 6 percent of the weight of the deposit.

5. A process as in claim 1 in which the cadmium and nickel are both present in the electrolyte as nitrates.

* * * * *